April 30, 1968 G. E. HENDRIX ET AL 3,380,261
METHOD AND APPARATUS FOR MAKING ICE
Filed April 4, 1966 8 Sheets-Sheet 1

Fig. 1

INVENTORS
Grover E. Hendrix
Charles M. Tunnell
BY
ATTORNEYS

INVENTORS
Grover E. Hendrix
Charles M. Tunnell

April 30, 1968 G. E. HENDRIX ET AL 3,380,261
METHOD AND APPARATUS FOR MAKING ICE
Filed April 4, 1966 8 Sheets-Sheet 6

INVENTORS
Grover E. Hendrix
Charles M. Tunnell

BY

ATTORNEYS

April 30, 1968

G. E. HENDRIX ET AL 3,380,261

METHOD AND APPARATUS FOR MAKING ICE

Filed April 4, 1966

INVENTORS
Grover E. Hendrix
Charles M. Tunnell

BY

ATTORNEYS

April 30, 1968

G. E. HENDRIX ET AL 3,380,261

METHOD AND APPARATUS FOR MAKING ICE

Filed April 4, 1966

INVENTORS
Grover E. Hendrix
Charles M. Tunnell

BY

ATTORNEYS

United States Patent Office 3,380,261
Patented Apr. 30, 1968

3,380,261
METHOD AND APPARATUS FOR MAKING ICE
Grover E. Hendrix, 2054 Alhambra St., Dallas, Tex. 75217, and Charles M. Tunnell, 3923 Lawnview Ave., Dallas, Tex. 75227
Filed Apr. 4, 1966, Ser. No. 539,876
22 Claims. (Cl. 62—138)

This invention relates to a method and apparatus for making ice. In a more specific aspect, the present invention relates to a refrigeration-harvest cycle type of apparatus for making ice.

It is therefore an object of the invention to provide an improved method and apparatus for making ice.

Another object of the invention is to provide an improved method and apparatus, of the refrigerator-harvest cycle type, for making ice.

A further object of the invention is to provide an improved method and apparatus for making ice wherein the ice making capacity per horsepower of energy utilized is substantially improved.

Another object of the invention is to provide an improved method and apparatus for making ice wherein the ice is formed in a static body of water, and which requires no water pump to supply water for the formation of ice.

A further object of the invention is to provide an apparatus for making ice which requires no spray nozzle system, no cutting and/or crushing operation, and no washing operation.

A further object of the invention is to provide an improved apparatus for making ice which requires less maintenance, has fewer moving parts and which is easily accessible for servicing.

Another object of the invention is to provide an improved apparatus and method for making ice which requires only a single limit switch and control thermostat for controlling the entire refrigeration-harvest operation.

Still another important object of the invention is to provide an improved apparatus for making ice having an improved coil system for freezing ice from water, in which the coil system directs the refrigerant fluid to the points where it will absorb the maximum amount of heat from the water.

A further object of the invention is to provide in an improved apparatus for making ice an improved baffle-type coil system for freezing water, which is designed to prevent refrigerant fluid from logging in the system, and which provides a novel means of releasing the ice from the freezing coil during the harvest portion of the cycle, utilizing hot gas from the refrigerant compressor to release the ice from the cooling coil on which it is formed, by flowing such gas through the coil from upstream of the expansion valve, bypassing the expansion valve, providing a hot gas bypass defrosting cycle.

Another object of the invention is to provide an improved apparatus for making ice in which a cooling coil is brought into contact with the static body of water in a novel manner, by lowering and raising the static body of water into and out of contact with the ice forming coil by means of a piston type hydraulic system for lowering and raising the body of static water.

Still another object of the invention is to provide an improved apparatus for making ice in which the formation of a predetermined amount of the ice on the heat exchanger coils in the static body of water automatically changes the system from the refrigeration portion of the cycle to the harvest portion of the cycle, and wherein the harvesting of the ice from the ice making coils produces a temperature condition at the coil which automatically causes reversal of the cycle from harvesting to refrigerating operation.

A still further object of the present invention is to provide an improved apparatus for making ice in which the body of water is moved into contact with the ice-making coil only at times during the refrigeration cycle when such coil is pre-cooled and at a near freezing temperature.

Another object of the invention is to provide an improved apparatus for making ice having a novel means for adding water to the system, by an automatic float system, actuated to add water automatically when the water pan is disposed adjacent the coil which forms the ice; and, having a counter weight means for inactivating the float system during the harvesting of the ice.

A further object of the invention is to provide an improved apparatus for making ice having a novel simple mechanical drain system, which operates at predetermined intervals during the ice-making operation, and is controlled by the water container or pan moving toward and away from the ice-making coil.

Another object of the invention is to provide an improved apparatus for making ice which operates automatically in accordance with the level of ice in a storage bin, in which the temperature in the ice storage bin is sensed and the system is turned off and on automatically in accordance with the sensed temperature of the body of stored ice in the bin.

A particular object of the invention is to provide an improved apparatus for making ice having a novel system for sensing when a predetermined body of ice is formed on the ice-making coil, which automatically lowers the pan of water to remove the body of water from contact with the ice-making coil when such predetermined body of ice is formed on the coil, and which automatically starts the harvest cycle when such predetermined body of ice is formed on the ice-making coil; a thermostatic control means including a sensing means adjacent the ice-making coil automatically actuates hydraulic means which lowers the pan of water and starts the harvest cycle.

An important object of the invention is to provide an, ice making apparatus and method in which a plurality of cup-like separate bodies of ice are formed from a body of still or static water, and wherein the body of water is changed completely during each cycle, so that each batch of ice is formed from fresh water; and, wherein means is provided in the apparatus for reducing the volume of the body of static water exposed to the action of the freezing members, thereby reducing the volume of water subjected to cooling and refrigeration adjacent the freezing elements and further reducing the amount or quantity of water wasted as a result of draining the body of water during each cycle, whereby the foregoing results are obtained with a minimum power use in heat exchange during the freezing cycle, thus requiring a lesser amount of power to produce the desired volume of ice and permitting the formation of the desired quantity of ice bodies in a shorter period of time.

Additional objects and advantages of the invention will be readily apparent from the reading of the following description of a device constructed in accordance with the invention, and reference to the accompanying drawings thereof, wherein.

In the drawings, the numeral 10 designates generally an ice making apparatus constructed in accordance with the invention and including a refrigeration cabinet 11 in which ice in the form of cups or tubes is frozen and from which it is transferred, as will be hereinafter fully explained, from the freezing chamber or ice making chamber to a storage bin 12 connected therewith by way of a chute 13 opening into the upper portion of the bin.

The refrigeration cabinet 11 is substantially rectangular in form and has a front wall 14, a rear wall 15, a left side wall 16 and a right side wall 17, supported by upright angle frame members 18, 19, 20 and 21 extending vertically between base angle members 22, 23, 24 and 25 and a right hand upper or header angle frame member 26 extending between the right hand pair of upright angles 19 and 20 from front to rear at the upper ends thereof, and a left hand upper or header frame angle member 27 extending between the upper ends of the left hand pair of upright members 18 and 21. Intermediate the upper and lower ends of the upright angle frame members, about two-thirds of the distance between the bottom and the top ends thereof, are secured horizontal supporting angle members 28, 29, 30 and 31, which form a base for supporting the water and freezing elements of the unit and which separate and divide the compartments 11 into a lower motor, compressor and control chamber 35, and an upper freezing chamber 36. Side walls 14, 15, 16 and 17 are suitably secured to the upright angles and enclose the working parts of the apparatus within the frame, and are removable to provide access to the machinery therewith. The upper end of the housing is closed by a cover 33.

The freezing chamber is also enclosed by panels of suitable insulation material, such as Styroform, expanded polyurethane, or the like, the panels being either adhered to the adjacent wall covers and top cover, or separately removable, as desired. Each insulation panel is identified by the numeral corresponding to the adjacent cover member with the letter a as a postscript, the front wall insulation panel being 14a, the rear wall panel being 15a, the left side panel 16a, the right side panel 17a, and the top panel being 33a. A bottom panel of insulation 30a is disposed on and supported by the horizontal supporting angle members 28, 29, 30 and 31, and thus, with the wall and cover panels, completely encloses the freezing chamber.

The ice receiving bin 12 is also formed in substantially rectangular shape and has suitable frame members 38 and insulated walls 39 supported on a base 40. An opening 41 in the upper left hand side wall of the bin receives the discharge chute 13 from the ice forming freezing chamber 36, and the cups or tubes of ice are discharged into the bin and stored therein for removal by the user through suitable doors 42 hingedly mounted to cover an opening 43 in the front wall of the bin and providing access thereto for removal of the ice. Of course, the opening 43 and the doors 42 may be larger than shown if desired.

Mounted within the lower compressor and control chamber 35 are a motor compressor unit 45, a condenser 46, a cooling fan 47, and motor 48, and a liquid refrigerant receiver 49, all forming part of the usual refrigerating or ice making system. The members are mounted and supported by suitable horizontal base support members secured between the base angle frame members 22, 23, 24 and 25. The motor-compressor unit is connected by suitable conduit tubing 58 with the condenser 46 which is in turn connected by conduit tubing 59 with the receiver 49. The receiver is connected by suitable conduit tubing 50 with a dryer 51, which also communicates with a sight glass 52, from which the refrigerant is directed by way of a tubular conductor 53 to an expansion valve 54 which controls the admission of the liquified refrigerant through a conduit 55 into the evaporator or cooling coil 56. The expanded refrigerant is returned from the cooling coil through a conduit 57 to the motor-compressor, and the refrigerant gas is again compressed and conducted through the conductor 58 to the condenser 46 where the hot liquid refrigerant is cooled and delivered by way of the conduit 59 the liquid receiver 49.

The expansion valve 54 is controlled by a sensing element 60 connected with the conduit 57 from the evaporating coil 56, so that any suitable amount of refrigerant is passed through the coils to maintain the desired cooling conditions, as will be hereinafter more fully explained.

The pressure of the liquified gas in the receiver 49 is sensed through the conductor line 61 which leads from the conduit 50 at a point between the receiver and the dryer to a pressure switch 62 for controlling actuation of the condenser cooling fan, as will also be hereinafter more fully explained.

Figure 5:
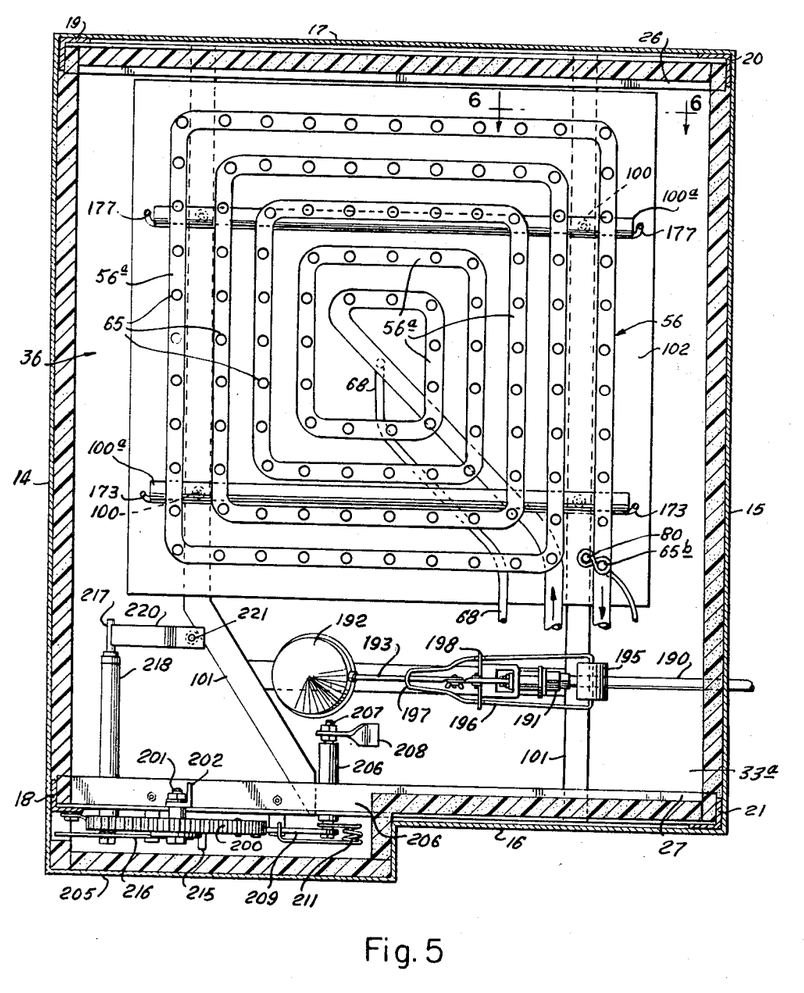
FIGURE 5 is a horizontal cross-sectional view, taken on the line 5—5 of FIGURE 4.

Hot gas by-pass defrosting of the cooling or freezing coil 56 is effected by means of hot refrigerant conducted through a tubular conduit 66 to a solenoid valve 67, from which a conductor tube or tubular conduit 68 extends to the inner or inlet end of the tubular cooling coil 65, as clearly shown in FIGURE 5, whereby the hot liquid refrigerant may be conducted to the cooling coil upon occurrence of predetermined conditions hereinafter more fully set forth to circulate the hot refrigerant through the cooling coil to defrost the coil and release ice cups or tubes formed on the fingers 65. From the cooling coil, the hot liquid refrigerant is returned by way of the tubular conduit 57 to the compressor, where it is again compressed and returned by way of the condenser to the receiver.

The operation of the refrigerant system may be briefly described as follows: The refrigerant motor-compressor 45 is supplied with electrical energy through the electrical conductors 70 and 71 and operates to compress the refrigerant in the system. The hot compressed gas from the compressor is discharged from the compressor at a temperature of about 175 to 200 degrees Fahrenheit, and passes through the conduit tube 58 to the condenser 46, where it is cooled by means of the fan 47 operated by the motor 48, which is supplied with energy through electrical conductors 72 and 73. The cooled liquid refrigerant from the condenser is delivered at a temperature of about 105 degrees Fahrenheit through the conductor 59 to the liquid receiver 49 where it is stored for use. From the receiver 49 the liquified refrigerant passes by way of the conductor 50 through the dryer 51, the sight glass 52 and the conductor 53 to the expansion valve 54 which controls flow of the high pressure liquid refrigerant from the receiver to the expansion coil or freezing coil 56. The pressure in the conductor line 50 is sensed by means of the conductor 61 and the pressure switch 62, which is electrically connected by the electrical conductors 73 and 74 to the fan motor 48 and a source of electrical energy S. The pressure within the conduit 58 of the system thus controls actuation of the switch 62, and thereby controls operation of the fan motor and fan for cooling the hot compressed refrigerant in the condenser 46. The pressure sensing switch is normally set to an operating pressure of about 120 to 150 pounds per square inch.

The operation of the expansion valve 54 is controlled by the temperature sensing element 60 which is operatively connected therewith and is disposed in heat exchanging relationship with the return line 57 from the evaporator cooling or freezing coil 56. When the temperature on the return line becomes sufficiently high, it is sensed by the sensing element 60, which functions to open the expansion valve 54 to permit the liquid or saturated refrigerant from the liquid receiver 49 to pass through the valve by way of the conduit 55 to the evaporator or freezing coil 56 at a temperature of about 40 degrees Fahrenheit. As the refrigerant enters the freezing or evaporator coils, it is further expanded and cooled to reduce the temperature of the depending ice cup or tube forming fingers or nipples 65 to a sufficiently low temperature to freeze water in contact with such fingers on nipples in the body of water in which the fingers or nipples are disposed.

From the evaporator or freezing coil the expanded gas returns to the compressor 45 by way of the return conduit 57, and the gas is again compressed and delivered through the condenser to the liquid receiver.

Thus, it will be seen that the usual refrigeration system has been described for delivering refrigerant to the cooling or evaporator coil for freezing water in which the depending fingers or nipples 65 are immersed.

Figure 10:
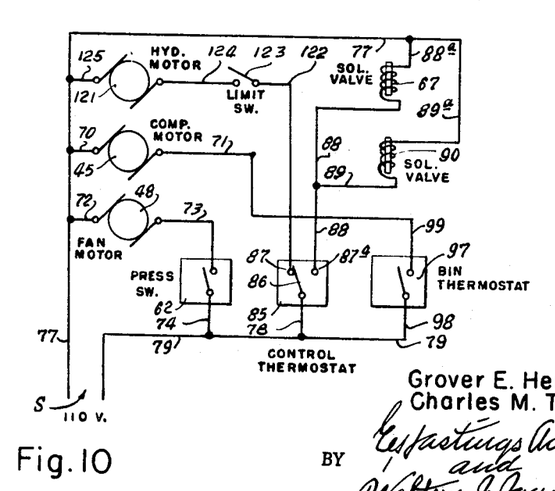
FIGURE 10 is a schematic wiring diagram showing the electrical control system for the ice-making apparatus.

As the ice is formed on the depending fingers or nipples 65 of the evaporator coil 56, the diameter of the body of ice cup or tube so formed expands until the ice contacts a sensing bulb or element 80 which is secured adjacent one of the depending fingers or nipples, preferably one of the fingers or nipples 65 farthest from the expansion valve 54, and near the discharge end of the coil 56. When the ice contacts the sensing element 80, which is operatively connected by means of a conduit 81 with a control thermostat switch 85, the sensing element causes the switch to be moved from the normally closed position, shown in FIGURE 10, in which the swingable contact arm 86 is engaged with the contact 87 to a position in which the contact arm 86 of the switch engages a contact 87a connected by way of an electrical conductor 88 with the solenoid valve 67 which controls the hot gas by-pass cycle defrosting operation, to thus set into operation the defrosting cycle for removal of the formed ice cups or tubes from the depending fingers or nipples 65.

Since the sensing element or bulb 80 for the control thermostat is disposed near the discharge end of the spiral evaporator coil 56, it will be seen that the ice must be freed from all the other fingers 65 of the coil before the ice is freed from the finger 65a adjacent which the sensing bulb 80 is disposed. When the ice on the finger 65a drops off, the ambient temperature at the sensing bulb 80 gradually warms until it energizes the control thermostat switch 85 to move the swingable contact arm 86 from engagement with the contact point 87a to free it for movement back to its normally closed engagement with the contact point 87. The normally closed solenoid valve 67 is thus closed to again shut off the flow of hot refrigerant through the conduits 66 and 68 to the evaporator coil, and normal ice forming operation of the system is again resumed.

The conductor 88 from the control thermostat is also connected by an electrical conductor 89 with a normally closed hydraulic pump control solenoid valve 90, which controls circulation of hydraulic fluid for operating a hydraulic cylinder lift 91 which moves a pan 92 containing water from a lowered position, shown in FIGURES 1 through 4, to an upper position in which the depending fingers of the evaporator coil are immersed in the water in the pan so that the ice may be formed on the fingers so immersed. Operation of this water pan will also be hereinafter more fully described. The pump control solenoid valve is energized by means of a conductor 89a which extends from the solenoid valve to a common conductor 77 which extends from the source S and to which the conductor 72 from the fan motor, the conductor 70 from the compressor motor, and the conductor 88a form the solenoid valve 67 are connected to establish an electrical circuit therethrough. The control thermostat is also connected by means of a power conductor 78 with a common conductor 79 extending from the source S and connected with the conductor 74 of the pressure switch and the conductor 78 of the control thermostat.

For controlling operation of the refrigerating system, a sensing bulb 95 is connected by way of a conduit 96 with a normally closed bin thermostat switch 97 which controls actuation of the motor-compressor unit 45. When the ice stored in the bin 12 drops below the level of the thermostat sensing element or bulb 95, the bin thermostat switch 97, which is normally closed, establishes electrical connection between the common conductor 79 by way of a conductor 98 connected with the thermostat switch and a conductor 99 leading from the thermostat switch and connected with the conductor wire or lead 71 of the motor compressor. Thus, when the level of the ice in the bin is low, the switch remains normally closed until sufficient ice has been made and harvested and transferred into the bin to bring the ice into contact with the sensing bulb 95, which then effects actuation of the bin thermostat switch 97 to open the circuit and cut off operation of the motor-compressor unit 45. Thus, the motor-compressor unit runs during the entire time that the bin 12 is not sufficiently full of ice to cause the thermostat switch 97 to cut off the supply of energy to the motor compressor.

Within the upper freezing chamber 36, the evaporator cooling coil or freezing coil 56 is suspended by suitable bolts 100 or suspension tubes 100a from the angular supporting members 101 extending transversely of the chamber between the upper angular frame members 26 and 27. A panel of insulating material 102 is also supported by said bolts and clips immediately above the cooling or freezing coil 56 to further insulate the same from the cover at the upper end of the chamber.

The rectangular water pan 92 is supported on the upper end of a piston 105 which is slidable in the hydraulic lift cylinder 91a, and a suitable substantially X-shaped base support 103 is secured to the underside of an insulating panel 104 which is disposed beneath and secured to the lower insulated bottom wall 106 of the water pan 92 and provides means for connecting the piston rod to the pan by the threaded engagement of the rod with the central portion of the support. The side walls 107 of the water pan are also insulated. Support brackets or angular support legs 108 are secured to the four corners of the pan and depend below the frame 103 for supporting the pan on the insulated bottom 30a of the freezing chamber when the pan is in its lowermost position.

The piston head 105a on the lower end of the piston rod 105 has a seal ring 110 which seals between the piston head and the bore wall of the cylinder 91a of the hydraulic lift 91, and a conductor tube 115 is connected by means of suitable bushings 116 with a port in the head 117 closing the lower end of the cylinder 91a, and an upper drain conduit 118 is connected by a bushing 119 with the upper end of the bore of the cylinder 91a above the piston head 105a, whereby hydraulic fluid may be introduced into the cylinder on underside of the piston head to cause longitudinal movement of the piston rod 105 with respect to the cylinder to elevate the pan of water.

Hydraulic fluid for operating the hydraulic lift is supplied by a suitable hydraulic pump unit 120 having a fluid reservoir and a pump therein driven by an electric motor 121. The motor is energized by electrical current conducted by way of a conductor 122 connected with the contact point 87 of the control thermostat through a normally closed limit switch 123 which is connected by a conductor 124 with the motor 121 which operates the hydraulic fluid pump. The motor is also connected by a conductor 125 with the common lead wire 77 from the source S of electrical energy, whereby when the control thermostat is in the normally closed position with a circuit established by the swingable contact 86 engaging the contact point 87, the circuit is established through the normally closed limit switch 123 to energize the motor 121 for driving the hydraulic fluid pump. Hydraulic fluid from the pump passes outwardly through a conductor tube 130 and a back flow check valve 131 to the conductor 115 which communicates with the underside of the bore of the cylinder 91a below the piston head 105a, whereby the hydraulic fluid pumped into the cylinder acts on the piston head to move the piston rod 105 upwardly and lift the water pan 92 upwardly. Any fluid which seeps or leaks into the cylinder above the piston head will be drained or forced outwardly therefrom through the conductor tube 118 back to the hydraulic pump unit 120.

A drain tube 130 having an enlarged bore at its upper end is secured by welding or otherwise in fluid tight communication with the bottom of the interior of the water pan 92 so that water contained within the water pan may drain outwardly from the pan through the conductor tube 130. The lower end of the conductor tube is slidable through wheeled guide means 130a in the insulating panel 30a into a waste conduit 140 which extends downwardly and outwardly by means of a drain conduit 141 extending through the wall of the motor compressor chamber 35 into communication with a sewer or other drain or waste pipe. The drain conduit 141 is supported by suitable clamps 142 secured to angle cross braces 143 in the lower portion of the motor compressor and control chamber.

A sleeve or plunger valve member 133 is slidable in the enlarged bore 132 at the upper end of the drain tube 130 and is provided with a plurality of spaced depending feet or prongs 134 which engage the upwardly facing shoulder 135 at the junction between the enlarged upper bore and the bore of the tube 130. The valve 133 thus closes the drain tube when it is in its lowermost position in enlarged bore, and retains water in the pan.

A suitable drain hose or conductor 145 has its upper end extending through the metal plate forming the lower portion of the insulating panel 30a closing the lower portion of the freezing chamber 36 and is welded or otherwise suitably secured to such metal plate. The lower end of the conductor tube is connected with the drain pipe or waste conduit 140 below the lower end of the slidable drain tube 130 when in its lower position. Thus, water drained into, overflowing or spilled into the freezing chamber and deposited on the upper surface of the insulating panel 30a may drain outwardly through the drain hose or pipe 145 and through the waste pipe 140 to a suitable place of disposal.

As the water pan 92 is lifted by the piston rod 105 which is moved upwardly by hydraulic fluid entering the cylinder 91a below the piston head through the conductor tube 115, the drain tube 130 is moved upwardly in the waste pipe 140 until an annular projecting ring or detent member 150 on the lower portion of the drain tube engages a roller 151 on the free swingable end of a feeler arm 152 mounted on the limit switch 123. When the detent ring 150 engages the roller 151 of the feeler arm 152, the feeler arm is swung into engagement with the actuating button or push rod 153 of the limit switch to move the same to open the switch and break the electrical circuit supplying energy to the motor 121 driving the hydraulic fluid pump. With the pump stopped, hydraulic fluid no longer is forced into the cylinder 91a below the piston head 105a, and the check valve 131 connected with the conductor 115 prevents back flow of such hydraulic fluid from the cylinder to the pump or reservoir therein. The piston head 105a, and the rod 105 therefore remain in the upper position holding the water pan 92 in its upper position with the depending fingers or nipples 95 of the freezing coil suitably immersed in the water W in the pan, whereby the freezing cycle may take place to form ice on the fingers or nipples as has been described.

When the sensing bulb 80 is contacted by the ice formed on the nipples, causing energization of the control thermostat to move the swingable switch arm 86 from its normally closed position in engagement with the contact 87 to its other position in engagement with the contact 87a, the solenoid valve 90 is energized to open the valve and permit the hydraulic fluid in the cylinder below the piston head to flow from the conductor tube 115 back through a drain or return tube 160 through the valve 90 to a conductor tube 161 which returns the fluid into the tank or reservoir of the hydraulic fluid pump, and permits the piston head 105a and the piston rod connected therewith to move downwardly in the cylinder 91a. The weight of the water pan and the water remaining therein facilitates downward movement of such fluid. Also, during downward movement of the piston head 105a air may enter through the conductor tube 118 into the bore of the cylinder 91a above the piston head 105a. If desired, of course, hydraulic fluid may be directed from the pump into the cylinder above the piston head to positively move the piston downwardly and fluid directed to the underside of the piston head to lift the water pan, to positively control movement of the water pan in both directions.

After the ice has been formed during the refrigeration or ice making cycle with the water pan in the elevated position and the sensing member 80 has energized the control thermostat 85 to lower the water pan and simultaneously to open the solenoid valve 67 to start the hot gas by-pass cycle defrosting or ice harvesting cycle by circulating the hot refrigerant from the refrigerant supply line 58 through the conductor tube 66 and the conductor 68 past the expansion valve 54 to the inlet end of the cooling or freezing coil, the circulation of the hot refrigerant heats the depending nipples or fingers 65 and to melt the ice interiorly of the cups in contact with the nipples and so frees the ice cups or tubes T formed thereon from the nipples, thus permitting the ice to slide down on and drop off the lower ends of the fingers or nipples into an open work basket or tray 170 formed of a plurality of spaced rods or wires supported at one end by a substantially U-shaped frame member 171 having upwardly and inwardly inclined and then downwardly inclined supported hook arms 172 formed at each of its opposite ends. The ends of said hook arms are supported in U-shaped hanger hooks 173 secured at their upper ends to the suspension tubes 100a and depending below the insulation to the sides of the cooling or freezing coil 56, whereby one end (the left hand end in FIGURE 1) of the tray is swingably or pivotally supported by said hooks and arms. The opposite end of the tray is also provided with a substantially U-shaped supporting frame member 175 which has arms 176 extending upwardly and rearwardly or inwardly of the tray toward the opposite end thereof and then downwardly to provide a supporting arm for slidable engagement with elongate slotted supporting hooks 177 secured at their upper ends to the other suspension tube 100a on the right hand side of the freezing coil and depend therefrom on the opposite front and rear sides of the freezing coil. The engagement of the hook arms 176 within the U-shaped slotted supporting arms 177 permits the right hand end of the tray 170 to swing upwardly and downwardly with the water pan as the same is raised and lowered. When the pan is raised to its upper position the tray 170 is supported in the bottom of the pan below the depending fingers of the freezing coil, and when the pan 92 is lowered to the position shown in FIGURE 1 the right hand swingable end of the trough 170 swings downwardly at an angle to a point at which the lower open end thereof formed by the U-shaped frame or support member 175 is disposed above the upper end of the chute 13, whereby ice cups or tubes freed from the depending fingers or nipples 65 and dropping onto the wire tray or trough 170 will slide freely down the wires of the trough and out the lower open end thereof onto the chute 13 and then into the storage bin 12.

It will be seen, therefore, that the ice cups or tubes formed on the fingers or nipples will be freed therefrom automatically during the hot gas by-pass defrosting harvesting cycle of the operation of the system resulting from the defrosting action of the hot refrigerant circulated through the freezing coil and the manner just described, and that the ice cups or tubes so formed will drop onto the wire trough or tray 170 and be guided thereby to the chute 13 and into the bin 12 automatically.

When the ice has been freed from all the fingers, so that the sensing element 80 is again subjected to the ambient temperature within the freezing chamber 36 and such temperature rises to a sufficient degree to cause said sensing element to permit the control thermostat to return to its normally closed position in which the swingable contact arm 86 is in engagement with the point 87, the solenoid valve 67 and 90 are permitted to return to their normally closed position, whereby flow of hot refrigerant from the conductor 68 through the freezing coil is terminated, and the drain conductor tubes 160 and 161 for hydraulic fluid are closed. At this time, the hydraulic pump motor 121 is energized by the closing of the control thermostat and the hydraulic fluid lifts the water pan 92 upwardly to dispose the pan in a position in which the fingers are again immersed in the water in the pan to repeat the freezing cycle.

The compressor motor 45 has been running at all times during both the freezing and defrosting cycles, since the storage bin 12 is not filled and the bin thermostat 95 permits the bin control thermostat 97 to remain in its normally closed position. Also, the pressure switch 62 has maintained the fan motor 48 in operating condition during such cycles.

Water removed from the pan 92 as a result of freezing thereof into ice cups or tubes T is replaced by means of a water conductor pipe or supply pipe 190 which is connected with a suitable source of supply of water and extends through the rear wall of the cabinet into the freezing chamber 36 to a flow control valve 191, the operation of which is controlled by a float 192 mounted on a swingable arm 193 pivotally mounted on the body of the valve 191 and normally biased to an upper valve closing position by a weight 195 on the end of a counter-balance arm 196 operatively connected with an open loop or link lost motion connection 197 at its opposite end with the arm 193 supporting the float, and also pivotally mounted on a cross pin 198 carried by the housing or body of the valve. The weight 195 normally holds the float arm and float elevated to hold the valve in closed position when the water pan is in the lower position shown in FIGURES 1 through 4. However, when the pan is elevated to its upper position, the weight 195 is lifted by engagement thereof with the bottom of the pan, and the lost motion connection 197 of the opposite end of the arm 196 with the float arm 193 of the float operated valve permits the float to lift the arm 193 and maintain the valve in closed position. However, when the level of the water in the pan drops sufficiently to permit the float to swing the arm 193 downwardly and open the valve, additional water is delivered into the pan until a suitable level has been reached therein, and the float is thereby lifted to swing the arm 193 to the upper position closing the valve. This valve operates in the usual manner of float operated flow control valves, so that the level of the water in the pan 92 is always maintained at the proper depth to form the ice cups or tubes of the desired length and size during each freezing cycle of operation.

An automatic drain for the water pan is provided for the purpose of assuring that the water in the pan is fresh or is changed at sufficiently frequent intervals to eliminate odors and other foreign matter from the ice being made. The assembly is designed to drain all the water from the pan at frequent intervals, and can be adjusted for any number of cycles of operation of the valve desired. Water is drained from the pan during the harvest cycle of the ice, and such draining is effected mechanically without use of power other than that derived from movement of the water pan.

Figure 1:
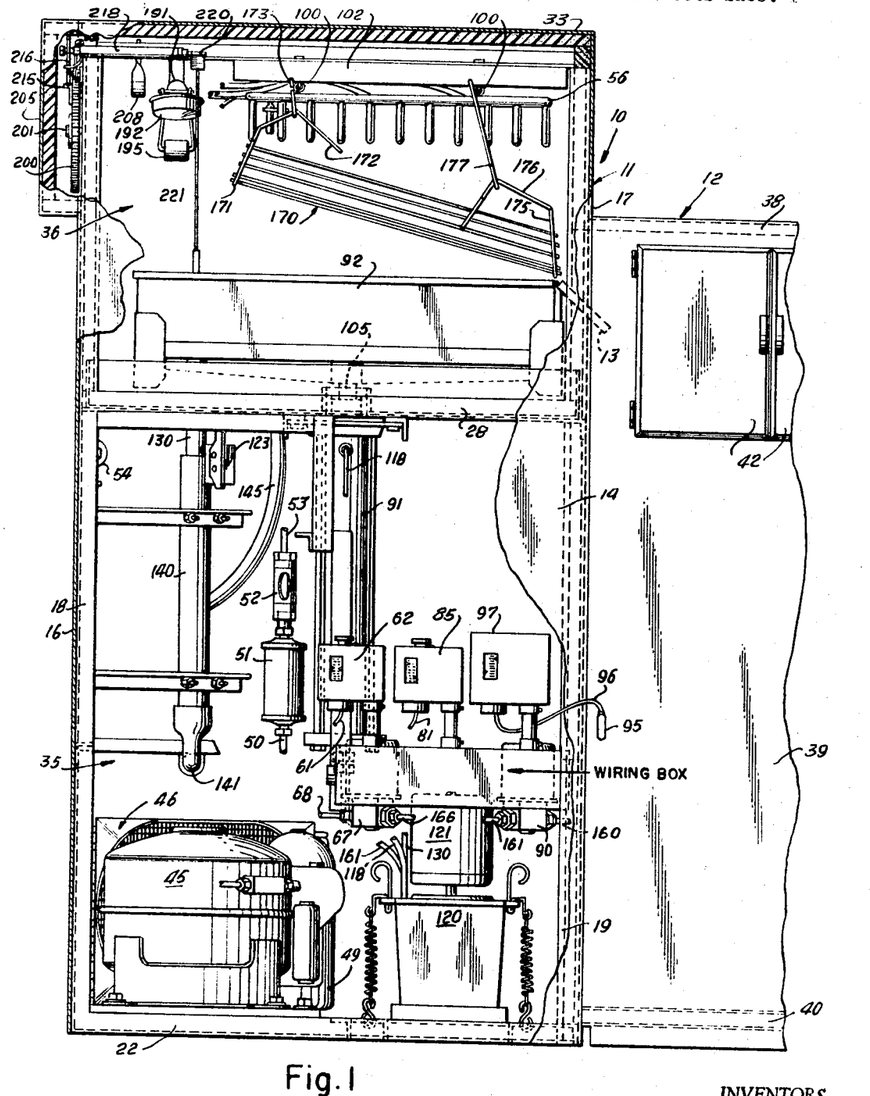
FIGURE 1 is a view, partly in elevation and partly in section, of the front of the ice-making apparatus and a portion of a storage bin.
Figure 2:
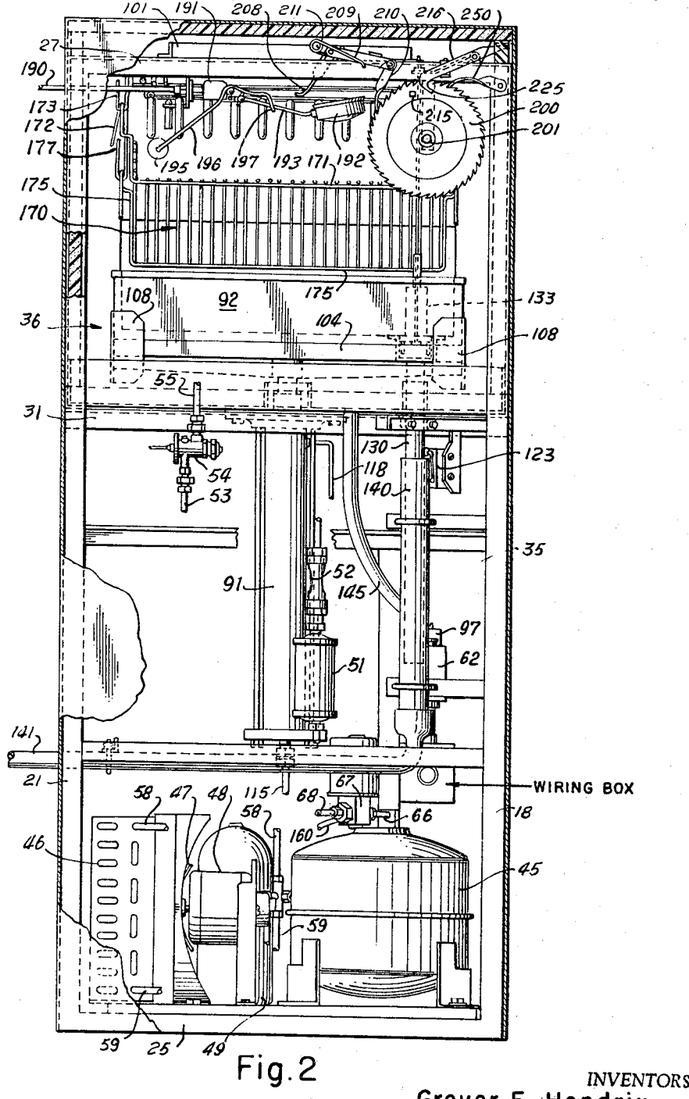
FIGURE 2 is a view, partly in elevation and partly in section, of the left side of the ice-making apparatus.
Figure 3:
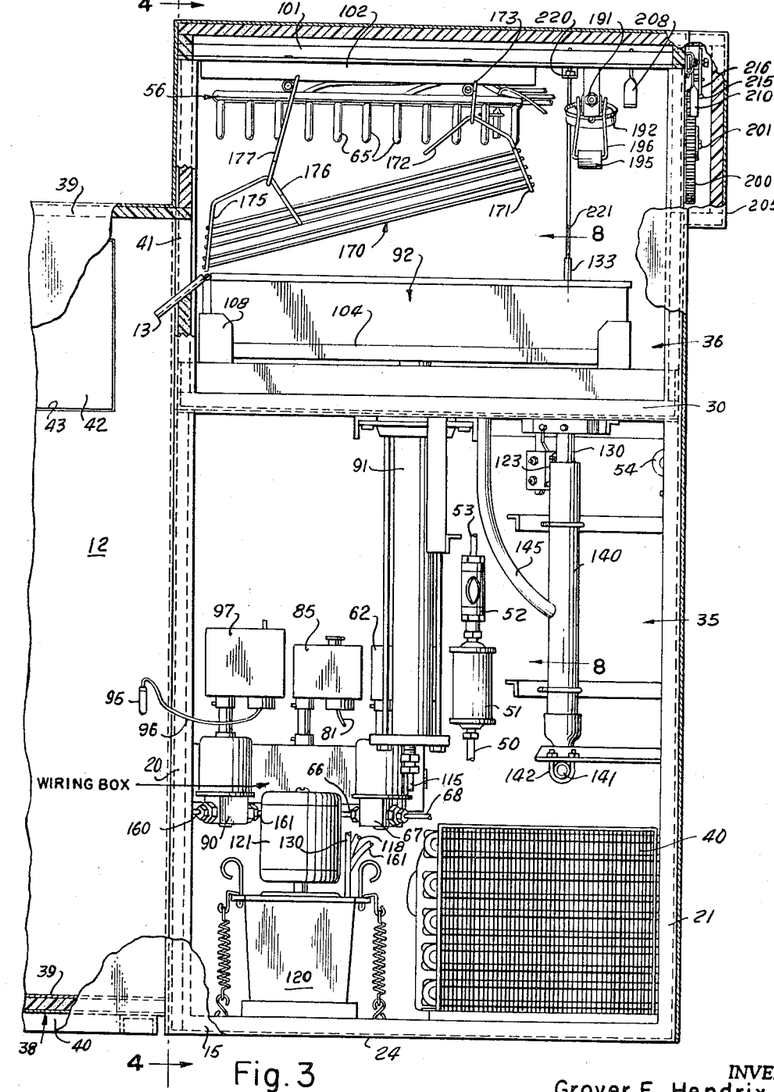
FIGURE 3 is a veiw, partly in elevation and partly in section, of the rear of the ice-making apparatus and a portion of the storage bin.
Figure 4:
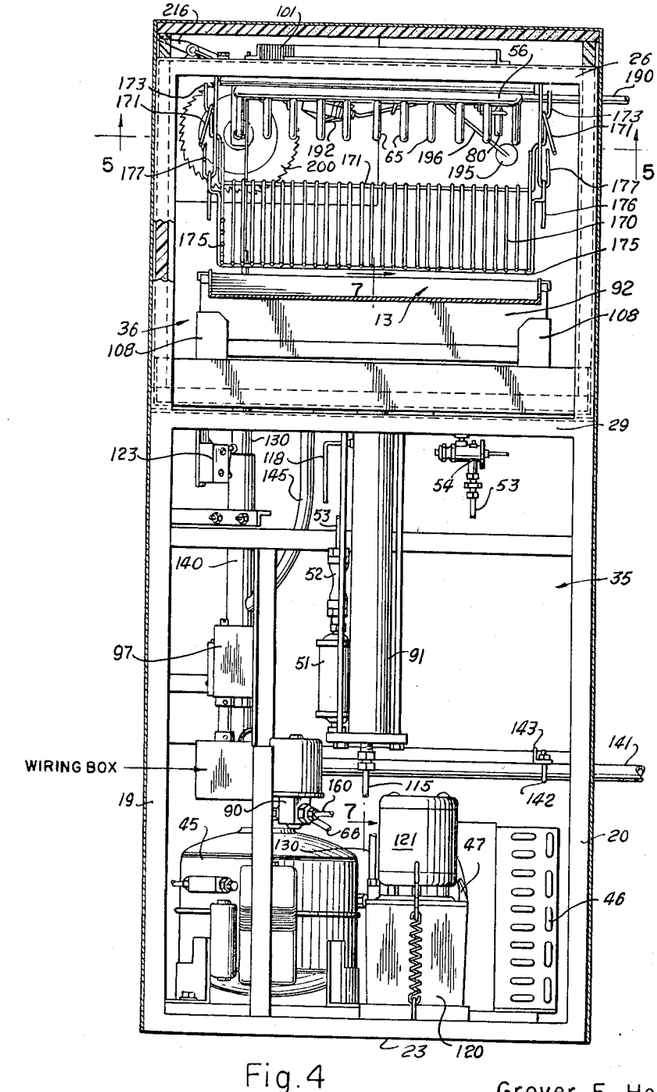
FIGURE 4 is a view, partly in elevation and partly in section, of the right side of the ice-making apparatus, with the storage bin omitted, taken along the line 4—4 of FIGURE 3.

A ratchet wheel 200 is mounted on a shaft 201 extending through the lower end of an angle support member 202 secured at its upper end to the transverse upper brace member 27, and said wheel is rotatable about the shaft 201. The ratchet wheel is disposed exteriorly of the frame of the apparatus in a separate laterally projecting insulated cover housing 205 removably fitting and covering an opening 206 in the upper front of the left side of the cabinet 11 and enclosing the ratchet wheel and its associated mechanism. A bearing 206 is secured suitably to the upper surface of the angle brace cross member 227 and a shaft 207 is rotatable in the bearing. On the inner end of the shaft within the freezing chamber 36 is a swingable actuating arm 208 having a curved lower end which is adapted to be engaged by the upper edge of one side of the water pan 92 as the water pan is lifted to its upper position, whereby the shaft 207 is rotated to rotate a ratchet lever arm 209 secured to the opposite end of the shaft and having a ratchet member 210 in actutaing engagement with the teeth of the ratchet wheel 200, whereby the swinging movement of the arm 209 causes the ratchet member 210 to move the ratchet wheel 200 a predetermined distance through an arc about its shaft. A catch or reverse limiting member 250 prevents rotation of the ratchet wheel in the opposite direction. A bifurcated spring 211 having one end secured to the shaft 207 and its opposite end engaged with the lever arm 209 bears against the lever arm to lift the end thereof having the ratchet member 210 connected therewith upwardly (as shown in FIGURE 2) to reengage the ratchet member with other teeth rearwardly of the direction of rotation of the ratchet wheel, whereby subsequent swinging of the ratchet arm will cause the ratchet wheel to be moved a predetermined distance. Each time the water pan is lifted, the actuating arm 208 is engaged by the upper edge of the pan and swings the ratchet arm 209 to move the ratchet member downwardly (FIGURE 2) to rotate the ratchet wheel through a predetermined arcuate distance. Mounted on the outer side of the ratchet wheel is a detent pin 215 which is moved with the wheel and is adapted to engage an elongate lever arm 216 mounted on one end of a shaft 217 journaled in a bearing 218 also secured to the upper surface of the transverse cross angle member 27 and having on the opposite end thereof an elongate lift arm 220. A lift rod 221 is swingably connected at its upper end by means of a socket bushing member 222 to the lift arm 220, and the lower end of the lift rod extends downwardly through an axial bore 223 in the valve closure plunger member or plug 133 which closes the enlarged upper bore 132 of the drain opening in the bottom of the water pan 92. An external annular flanged nut 224 threaded on the lower end of the rod 221 engages the underside of the valve plug or plunger 133, whereby when the rod is lifted the plug or plunger is lifted therewith out of the enlarged upper bore 132 of the drain pipe 130 to permit all water within the tank to drain outwardly therefrom. The length of the drain plug 133 is sufficient to extend to a point just below the upper edge of the side walls of the water pan, so that water does not pass through the axial bore of said plunger when it is in its lower closed position, but may pass therethrough if permitted to rise thereabove. The rod 221 is slidable through the axial bore of said plunger or closure as the pan is lifted and lowered, and thus also serves as a guide to assist the drain tube 130 in retaining the water pan in properly oriented position with respect to the freezing coil 56 as the pan is moved upwardly and downwardly by the hydraulic lift.

The detent pin 215 on the ratchet wheel 200 engages a hook 225 on the free end of the arm 216 when the ratchet wheel has been rotated a predetermined distance (360 degrees as shown in FIGURE 2), and thus swings the arm 216 upwardly. Such upward movement of the arm 216 also swings the lift arm 220 about the shaft 217 to lift the lift rod 221 therewith. Such lifting of the lift rod lifts the plunger or closure plug 133 out of the enlarged upper bore 132 of the drain from the pan when the pan is in its lowermost position shown in FIGURES 1 through 4 and 8. Any desired number of detent pins may be secured in the outer surface of the ratchet wheel 200 to actuate the lever arm at any desired interval, and thus drain the water pan as frequently as desired. When the water pan has been drained when the pan is at the lower position of its cycle, and the pan is then lifted to its upper position, the ratchet 210 rotates the ratchet wheel 200 to move the detent 215 out of engagement with the lever arm 216 and free the arm to return the lift rod 221 to its lower position. When the pan is lifted, of course, the plunger or closure plug 133 closes the enlarged bore 132 of the drain from the water pan to prevent water from draining from the pan when the pan is lifted to its upper position and the float valve is actuated to again fill the pan with water.

Figure 6:
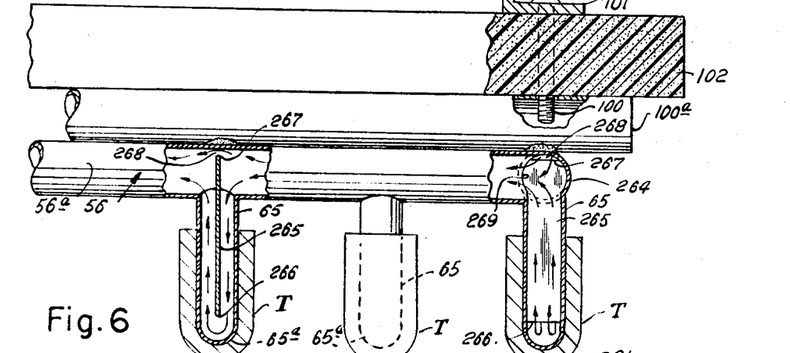
FIGURE 6 is an enlarged fragmentary view, partly in elevation and partly in section, of a portion of the heat exchanging coil of the ice-making apparatus.
Figure 7:
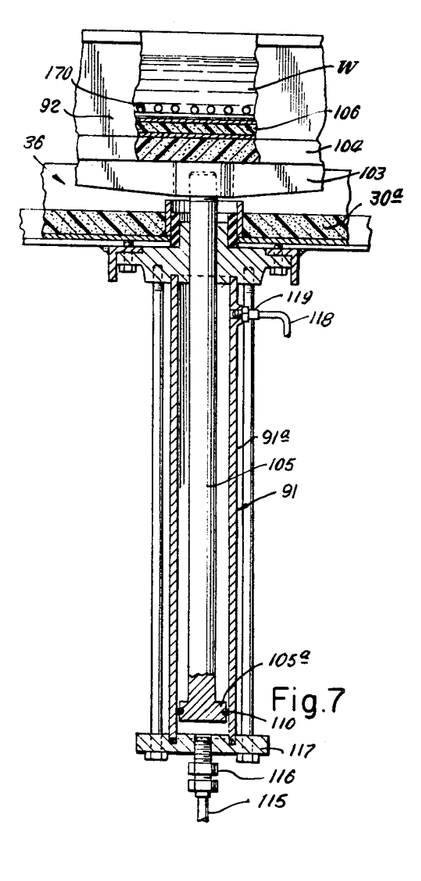
FIGURE 7 is an enlarged fragmentary view, partly in elevation and partly in section, of a portion of the hydraulic water pan moving means of the ice-making apparatus.
Figure 8:
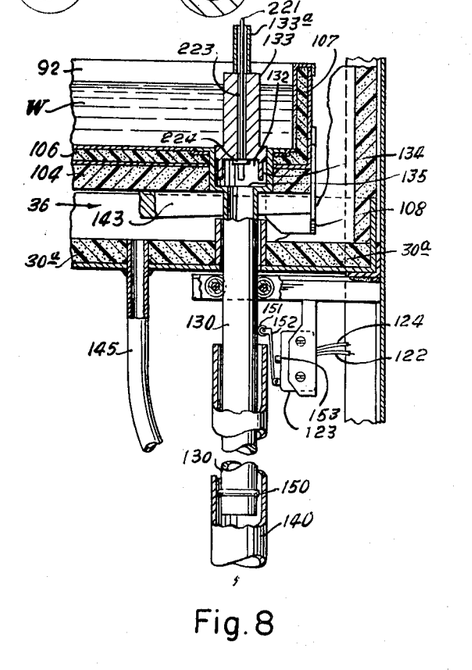
FIGURE 8 is an enlarged fragmentary view, partly in elevation and partly in section, of the drain system of the ice-making system, taken along the line 8—8 of FIGURE 5.
Figure 9:
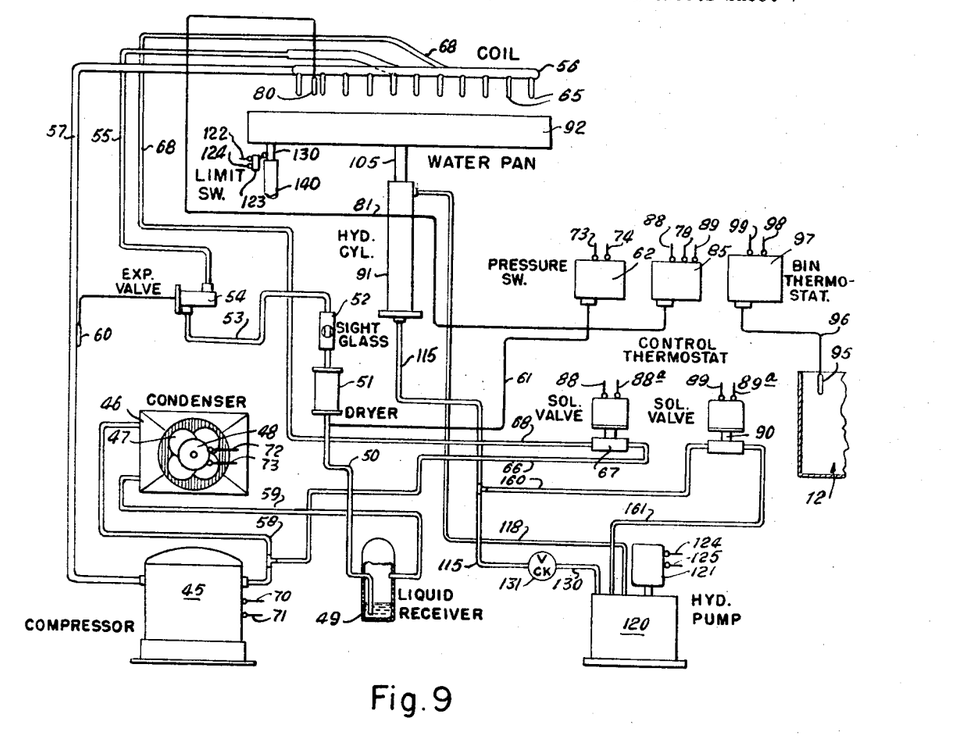
FIGURE 9 is a schematic diagram of the ice-making apparatus and system.

As shown in FIGURE 6, which is an enlarged view of the structure of the depending fingers or nipples 65 of the substantially rectangular spiral coiled cooling or freezing coil 56, each of the depending fingers is formed of a hollow cylindrical tube closed with a substantially hemispherical closure 65a at its lower end. Within each of the depending fingers is disposed a baffle plate 265 which extends diametrically across the bore of the finger engaging the opposite side walls of the finger. The lower end 266 of the baffle plate terminates short of the closure cap 265a closing the lower end of the nipple or finger, whereby refrigerant passing through the coil 56 and striking the baffle plate is directed downwardly between the baffle plate and one half of the wall of the depending nipple to a point adjacent the lower end thereof and then is directed upwardly between the baffle plate and the opposite half of the wall of the nipple and returned to the bore of the evaporator coil 56. The upper end 267 of the baffle plate is spaced from the upper portion of the wall of the tube 56a forming the evaporator coil 56, whereby a portion of the refrigerant may pass through the space 268 between the upper end of the baffle and the upper portion of the wall of the tube 56a of the evaporator coil. The baffle is also provided with lateral substantially semi-circular or arcuate arms 269 on each side of the upper portion thereof which fit against the side walls of the tube 56a and close the same against the passage of refrigerant therebetween.

It will be seen that the baffle plate and the area within the bore of the depending nipple 65 provides for further slight expansion of the refrigerant gases as they are directed downwardly therethrough and results in an increased cooling effect. Also, since the refrigerant gas is brought into close heat exchanging relationship through the walls of the nipples with the water being frozen, by virtue of the gas being directed downwardly in the nipple to the lower end thereof and then upwardly on the opposite side of the baffle back to the tube 56a of the refrigerating evaporator coil 56, the ice is formed quicker due to the intimate relationship of the refrigerant with the water in which the nipple is immersed. Also, as has been described, slight additional evaporation of the gas is provided in each of the nipples to increase the cooling effect. Furthermore, the provision of the baffles in the nipples with the opening in the lower portion thereof causes the refrigerant to positively move through the nipples and not accumulate as a liquid in the low points formed by the bottoms of the nipples. The refrigerant gas is therefore positively moved through the nipples and does not settle in liquid form in the nipples. Also, oil logging is eliminated by forcing the refrigerant through the course indicated by the arrows in FIGURE 6 to move any oil deposited in the lower portion of the nipples outwardly therefrom with the refrigerant.

It has been found in actual use that the nipples formed in the manner described produce ice at a rate in excess of twenty-five percent (25%) greater than refrigeration evaporator coils having nipples of the same type and construction without baffles formed therein.

From the foregoing, it will also be seen that the refrigeration apparatus described provides for accelerated cooling due to the particular structure of the depending nipples having the baffles 265 therein. Also, it will be particularly noted that, since the water pan is lifted into the upper position in which the depending nipples are immersed in the water, and since the water is not sprayed or washed over the freezing nipples, but is a still body of water into which the nipples are lowered and immersed, the freezing effect is completed at an accelerated rate. Also, elimination of water pumps and spray nozzles and the like has reduced the water soaking of equipment, and spillage and consequent undesirable conditions resulting therefrom. Also, since the still water freezes faster than flowing water the freezing effect, as has been pointed out, is accelerated.

In addition, the continuous series mounting of the nipples 65 on the heat exchanging evaporator coil provides for a more readily controlled operation and cycling, and it will readily be seen that the evaporator coil 56 may be formed in other configurations than the substantially square or rectangular configuration shown, so long as the tube 56a is a continuous conductor having the nipples 65 mounted thereon in spaced series arrangement. Furthermore, the hot gas by-pass cycle defrost system of the harvest cycle is brought into operation only after the nipples 65 with the ice formed thereon have been lifted out of the water in the water pan 92, so that the heat incident to defrosting and removal of the ice cups or tubes from the nipples during the harvesting cycle is not applied to the water in the water pan. In fact, the heated nipples produced by the defrosting operation are never brought into contact with the water. Instead, each time the defrosting or harvesting cycle is initiated by actuation of the control thermostat in response to the sensing of the ambient temperature adjacent the freezing or evaporator coil 56 by the sensing member 80, the heating cycle is immediately stopped and the refrigerating cycle is started before the water pan is lifted. Thus, precooled water is brought into contact with the freezing nipples during each freezing cycle, so that the nipples are at or near freezing temperature when they are immersed in the water in the pan. However, if fresh water is required for each batch of ice cups formed by the machine, the detents 215 on the ratchet wheel 200 may be set to open the drain valve 133 to drain the water pan each cycle.

Furthermore, it is apparent that a single control thermostat is used in conjunction with a limit switch to control actuation of the water pan cycle, removal and transfer of the ice cubes is effective automatically, transfer the ice cubes to a storage bin is effected automatically, water spray damage is substantially eliminated, control of the operation is determined by sensing means in the storage bin. Also, it will be seen that the water is frequently changed completely, to assure that clear and relatively tasteless ice is produced having no scents or foreign matter therein.

Figure 11:
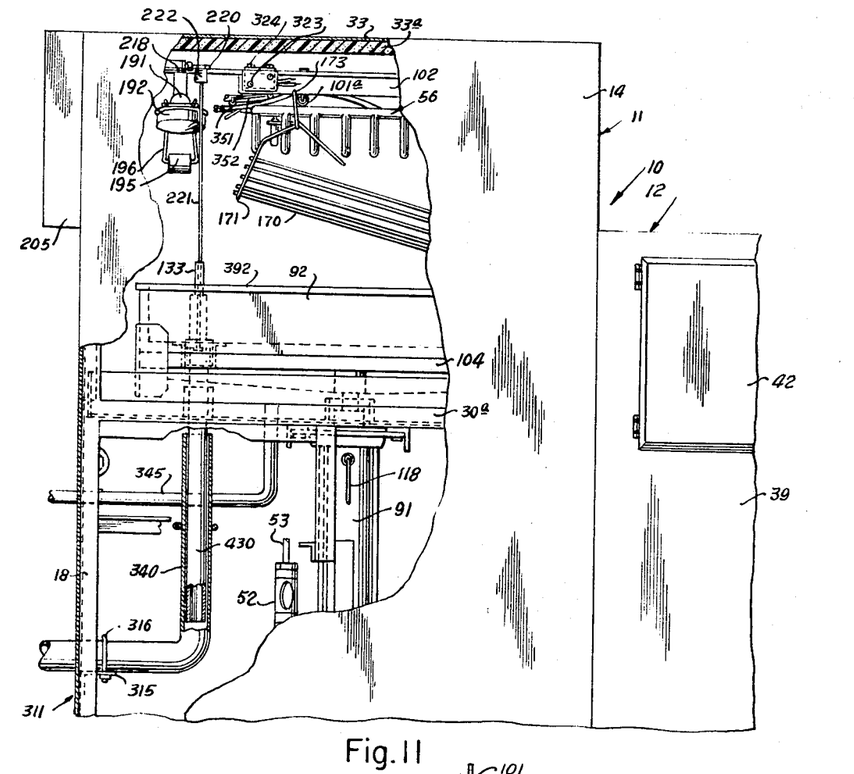
FIGURE 11 is a fragmentary view, partly in elevation and partly in section, showing a modified form of the ice-making apparatus and the modified control means and drain for the water pan.

A modified form of the invention is illustrated in FIGURE 11, in which the limit switch for controlling operation of the electric motor driving the hydraulic pump unit is moved to a position in which it is supported by the upper supporting angle member 101 at a point located above the upper edge of one side of the water pan 92. The switch 323 is secured by screws 324 or the like. The swingable actuating arm 352 is disposed on the underside of the switch body, and the contact or roller 351 on the outer end thereof is adapted to engage the upper edge 392 of the water pan 92 when the pan is in the raised position, whereby the arm 352 presses the operating plunger of the switch to open the circuit and stop operation of the hydraulic fluid pump and position the water pan in its upper position in the manner previously described. Also, the waste pipe 340 into which the drain tube 430 telescopes extends directly outwardly through the left side of the housing 311, being supported on a horizontal angle member 315 secured to the upright frame members 18 and 21 of the housing and secured thereto by a U-bolt 316 or other suitable means. The outer end of the waste pipe is adapted to be connected by a suitable flexible hose or other means to a drain or other means of disposal of the waste water. Also, the drain 345 from the bottom insulated wall 30a of the upper freezing chamber 36 extends downwardly then horizontally outwardly through the wall 311 as shown in FIGURE 11, and is adapted to be connected to a drain or the like for disposal of any water spilled in the chamber. Other structure of the apparatus shown in FIGURE 11 is identical with the form previously described and the same results and advantages are obtained thereby.

Figure 12:
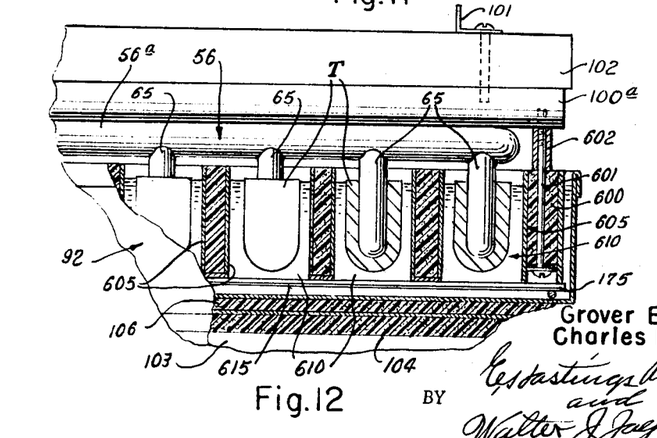
FIGURE 12 is a fragmentary view, partly in elevation and partly in section, of a modified form of the heat exchanging coil and water pan.

In FIGURE 12, a modified form of the evaporator heat exchanging coil and water pan construction is shown. The evaporator coil 56 and its mounting are identically the same in construction as the form first described, and the water pan 92 is also identical in construction to the form first described. In this modification of the invention, however, in order to reduce the amount of water used in each freezing cycle, when it is desired to completely drain the water pan 92 at the end of each harvest cycle and before the freezing cycle is re-initiated, a compartmented filler member 600 is suspended by bolts or screws 601 from the support member 100a which carries the evaporator coil 56. Suitable spacers 602 interposed between the support 100a and the upper surface of the filler member 600 locate the upper end of the compartmented filler member 600 slightly below the horizontal tube 56a of the evaporator coil 56. The filler member is preferably formed of insulating material, such as expanded polystyrene, "Styrofoam" or other suitable material having insulating qualities and which does not become water soaked. To further prevent water absorption into the filler member 600, and to assure that ice formed on the depending nipples 65 of the evaporator coil does not adhere to the filler member, a coating of "Teflon," or other suitable material which has a low coefficient of friction and to which ice will not adhere may be deposited on the exposed surfaces of the filler member to provide a layer 605 which is disposed on at least the lower and side surfaces of the filler member. This coating will therefore prevent water from entering the body of insulation forming the filler member and prevent adhesion of ice thereto.

A plurality of apertures 610 are formed in the body of the filler member, one disposed in longitudinal axial alignment with each of the depending nipples 65. The size of the apertures is substantially larger than the size of the depending nipples 65 so that the body of ice T formed on the nipples will be spaced from the walls of the apertures 610 during normal operation of the device. Should ice be formed of such size that it does contact the walls of the apertures, the "Teflon" or other plastic coating will prevent adherence to the filler body and permit ready slipping of the ice cups T downwardly off the nipples through the apertures and out the lower ends thereof during the harvesting cycle for transfer to the storage bin in the manner described for the first form of the invention.

The water pan 92 engages the bar 175 at the lower end of the tray 170 to lift the same upwardly, in the manner already described, until the tray is adjacent the lower surface of the filler body 600. As result, only the space between the bottom 106 of the water pan and the lower surface 615 of the filler member 600, and the space between the nipples 65 and the walls of the apertures 610 is filled with water. Thus, only a relatively small body of static water is introduced into the water pan during the cooling cycle, and less water is drained from the pan after the ice has been formed. Also, the insulating characteristics of the filler body 600 reduce the heat loss due to the ambient temperatures at the cooling coil, in addition to reducing the amount of warm water subjected to the refrigerating action of the depending nipples immersed in the water. Thus, the entire body of water in the pan from which the ice bodies or cups T are to be frozen may be changed during each cycle so that completely fresh water is used in forming each batch of ice cups.

The filler member 600 is supported by the screws or bolts 601 so that, when the water pan is lowered to the lower position during the harvesting of the ice cups, the filler body 600 remains in an elevated position surrounding the depending nipples 65, in the position shown in FIGURE 12. Furthermore, there is a delay period provided between the harvesting cycle and the freezing cycle which permits cooling of the depending nipples by the expanded refrigerant gas passing through the evaporator coil during the time between the actuation of the control thermostat terminating the defrosting cycle and reinitiating the freezing cycle, so that the nipples are cold when water is introduced into the pan. Thus, water in the pan is not subjected to heat from the defrosting cycle but is immediately subjected to cold or freezing conditions at the nipples. Also, the filler body 600 is likewise cooled as result of the fact that the nipples are disposed in the apertures therein; and, it will be seen that the heat from the hot gas in the nipples 65 during the defrosting cycle is not transferred to the filler body by means of the water, since the water pan is lowered immediately that the defrosting cycle is initiated, and since the water in the pan is moved below the nipples and drained from the pan there is no heat transfer between the nipples and the filler body.

It will thus be seen that the foregoing modification of the ice making machine provides for complete change of water, whereby ice may be formed of fresh water during each freezing cycle, that the volume of water used in forming the ice is materially reduced, that there is less waste of water as result of draining the water pan, and that the water in the pan is not subjected to heat from the defrosting cycle, but is introduced into the pan only after the freezing cycle has been re-initiated. Also, the advantages obtained by the form first described are present in this form of the invention.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An ice making machine comprising: a refrigerating mechanism including a motor compressor unit, a condenser, a liquid receiver, and an evaporator cooling member; a plurality of depending cooling nipples mounted at spaced intervals along said evaporator member; water container means for holding a body of water; means for moving said water container into and out of position to dispose the water therein in heat exchanging relationship with the nipples; means for reducing the volume of water in said water container exposed to the cooling nipples for reducing the volume of water required to form bodies of ice on said nipples; defrosting means for freeing ice formed on the nipples from the nipples while the water container is out of position in which the water is in heat exchanging relationship with the cooling nipples; means for draining and refilling said water container means with water while said water container means is out of position disposing the water therein in heat engaging relationship with the nipples to provide a fresh body of water for each freezing operation; and means for gathering the ice removed from the nipples in a place of storage.

2. An ice-making apparatus of the refrigeration-harvest cycle type, comprising: refrigerating means including compressor means, condenser means including a cooling tank connected to the refrigerant outlet of said compressor, a liquid receiving means connected to the refrigerant outlet of said condenser, expansion valve means connected to the refrigerant outlet of said liquid receiving means and cooling means connecting the refrigerant outlet of said expansion valve means and the refrigerant return inlet of said compressor; said cooling means comprising an elongate continuous tubular member having an inlet end and an outlet end and having a plurality of hollow fingers depending from and in open communication therewith, and baffle means extending across each of said fingers and across a portion of said tubular member immediately above said fingers and providing passages between the tops of said baffles and the adjacent portion of said tubular member and a slightly larger passage between the bottom of each of said fingers and the bottom of the baffles therein; pressure sensitive electrical switch means operatively connected at the said refrigerant outlet of said compressor and having a sensing element adapted to sense the pressure of the refrigerant discharged from said compressor and adapted to control operation of said condenser pan when the sensed pressure is above a predetermined value; a pan, adapted to contain a static body of water, mounted below said cooling means and supported in a manner to permit movement thereof toward and away from said cooling means to move said body of water into and out of contact with said fingers of said cooling means; hydraulic piston means rigidly attached to the bottom of said pan and adapted to move said pan upwardly and downwardly to move said body of water into and out of contact with said fingers of said cooling coil; hydraulic motive means for supplying hydraulic fluid under pressure to said piston; electrical switch means adapted to control actuation of said hydraulic motive means to move said pan to a position in which said body of water is in contact with said fingers of said coil and to control actuation of said motive means to move said pan to a position in which said body of water is in contact with said fingers of said coil; bypass conductor means leading from said refrigerant outlet of said compressor to the inlet end of said tubular member of said cooling means; first electrically-operated valve means in said bypass conductor between said compressor and said cooling means; hydraulic fluid return conduit means leading from said piston to said hydraulic motive means; second electrically-operated valve means in said return conduit between said piston and said motive means; temperature sensitive electrical control switch means having a sensing element mounted adjacent one of said fingers of said cooling means near the outlet end of the tubular member and opposite the end to which said bypass conductor is connected and spaced from said finger a distance sufficient to permit formation of a predetermined body of ice on said finger between said finger and said sensing element; said control switch being adapted to control actuation of said hydraulic motive means to move said water pan toward said cooling means when said sensing element of said control switch is out of contact with ice on said adjacent finger of said cooling means and said sensing element is in its warm condition, and, in the alternative, to inactivate said hydraulic motive means and open said first and second valve means when said sensing element of said control switch is in contact with ice on said adjacent finger and said sensing element is in its cold condition; and temperature sensitive compressor control switch means having a sensing element disposed in a storage bin containing ice made by the apparatus and adapted to maintain said compressor in its operating condition when said sensing element of said compressor control switch is out of contact with ice in said storage bin and said sensing element is in its warm condition, and to maintain said compressor in its inoperative condition when said sensing element of said compressor control switch is in contact with ice in said storage bin and said sensing element is in its cold condition.

3. In an ice-making apparatus wherein a cooling member is contacted with water to form a plurality of bodies of ice on portions of said member, the improvement comprising: a horizontally-disposed continuous tubular conductor member having a plurality of finger-shaped elements depending from the bottom of said tubular conductor member and in open communication with the interior of said tubular member; each of said elements having longitudinal baffle means extending transversely of said finger-shaped elements and across a portion of the bore of said tubular member immediately above said element; each of said baffle means having its upper end spaced from said tubular member a distance sufficient to permit passage of refrigerant over the upper end of said baffle from the tubular member on one side of said baffle to the tubular member on the opposite side of said baffle without passing through said depending finger element, and having its lower end spaced from the bottom of said finger element a slightly larger distance sufficient to permit the passage of refrigerant downwardly between one side wall of said finger element and one side of said baffle, between the bottom of said baffle and the bottom of said finger element, and upwardly between the other side of said baffle and the other side wall of said finger element.

4. In combination: a cooling member for use in an ice machine to be contacted with water to form a plurality of bodies of ice on portions of said member comprising: a generally horizontally-disposed main tubular conductor; a plurality of finger members having closed lower ends and having upper ends in open communication with said main conductor and depending downwardly therefrom; baffle means in each of said finger members extending from a point spaced above the closed lower end of said finger member extending from a point spaced above the closed lower end of said finger member to a point spaced below the upper portion of the horizontally disposed main tubular conductor to provide an opening at each end of the baffle whereby refrigerant may pass from the conductor on one side of the baffle through the opening at the upper end of the baffle to the conductor on the opposite side of said baffle, and whereby a portion of said refrigerant is directed downwardly through the finger member and will pass from one side of the baffle to the other at the opening at the lower end of the baffle in the closed end of the finger member; and temperature sensitive switch means having a temperature sensing element mounted adjacent one of said downwardly projecting finger members and spaced from said adjacent finger a distance sufficient to permit a predetermined thickness of ice to form on said finger between said finger and said temperature sensing element.

5. In an ice-making machine: a receptacle for water; means operatively associated with said freezing elements and said receptacle for water for reducing the volume of water in said receptacle exposed to contact with said freezing elements for reducing the volume of water in said receptacle required to form bodies of ice on said freezing elements; a freezing apparatus having freezing elements; hydraulically operated means for moving the water in said receptacle of water into and out of contact with said freezing elements of said freezing apparatus; and means for draining said receptacle of water and for supplying water to the receptacle and valve controlled means for supplying liquid to the hydraulically operated means, whereby the water in said receptacle is drained and replenished between each movement of said receptacle out of position in which the water is in contact with said freezing elements into a position in which said water is disposed in freezing contact with said freezing elements, whereby a fresh body of water is moved into contact with the freezing element each cycle.

6. An ice-making machine: an open top container for holding a body of water; a refrigerant conductor member having a plurality of downwardly depending freezing fingers having upper ends in open communication with said conductor member and closed at their lower ends; said conductor member being mounted over the container in a fixed position relative to the container, wherein said fingers will hang in the water and accumulate ice bodies thereon; each of said fingers having baffle means disposed therein extending from a point spaced above the closed lower end of said finger to a point spaced below the upper portion of the conductor member to provide an opening at each end of said baffle, whereby refrigerant may pass from the conductor on one side of the baffle through the opening at the upper end of the baffle to the conductor on the opposite side of said baffle, and whereby a portion of said refrigerant is directed downwardly through the finger member and will pass from one side of the baffle to the other at the opening at the lower end of the baffle in the closed lower end of the finger member; raising and lowering means for said container member for moving said container member toward and away from the refrigerant conductor member to bring the container member to a second position wherein the fingers and bodies of ice formed thereon are disposed above the body of water; means for draining and replenishing the body of water in said container member each time said container member is moved away from the refrigerant conductor member, whereby fresh water is exposed to freezing contact with the fingers of the refrigerant carrying member to form ice thereon; means for heating the fingers in said second position to cause release of the ice bodies therefrom; and a deflection member connected to said refrigerant carrying member and movable by gravity upon movement of said container member downwardly away from said refrigerant conductor member to an inclined position under the fingers to deflect the ice bodies falling from the fingers from falling into the water and to a remote point.

7. An ice-making apparatus of the character set forth in claim 7, wherein the means for raising and lowering the container member for the body of water which is moved into and out of said position in which said body of water is in contact with at least portions of said freezing finger members to form ice on said portions of said fingers, includes: a hydraulic piston rod having one end rigidly attached to the bottom of said container member and a piston head on its other end; a hydraulic cylinder annularly surrounding said piston rod and said piston head to form a lower hydraulic fluid chamber beneath said piston head; conduit means adapted to pass hydraulic fluid to said chamber of said hydraulic cylinder; and a source of hydraulic fluid under pressure connected to said conduct means.

8. A cooling member of the character set forth in claim 5, and a container for a body of water movable into and out of a position in which said body of water is disposed in contact with at least portions of said finger members to form ice; a water supply line mounted generally at the level of said main tubular conductor; valve means mounted on the outer end of said water supply line; float means operatively connected to said valve means and adapted to open said valve means when said water pan is in its uppermost position and the level of water in said pan is below a predetermined level and to close said valve when the water is at said predetermined level; and pivotally mounted weight means normally holding said float means in its inoperative, closed position when said pan is below its uppermost position, and depending downwardly a distance sufficient to contact the bottom of said pan and be raised by said pan when said pan is in its uppermost position thereby freeing said float to operate in accordance with the level of water in said pan, whereby the body of water in the container is changed to provide fresh water for each freezing cycle.

9. In an ice making machine: a receptacle for water; a freezing apparatus having freezing elements; hydraulically operated means for moving the receptacle of water to move the water in said receptacle into and out of contact with said freezing elements of said freezing apparatus; and means for draining said receptacle of water and for supplying water to said receptacle; valve controlled means for supplying liquid to the hydraulically operated means, whereby the water in said receptacle is drained and replenished between each movement of said receptacle out of position in which the water is in contact with said freezing elements into a position which said water is disposed in freezing contact with said freezing elements, whereby a fresh body of water is moved into contact with the freezing elements each cycle; means for draining the water from said receptacle including means for draining the water from said receptacle for each cycle of movement of said receptacle at the point in said cycle in which the receptacle is disposed at a position in which the water is out of contact with the freezing elements, and wherein said means for supplying water to the receptacle is actuated upon movement of the receptacle to a position adjacent the freezing elements.

10. In an ice making machine: a receptacle for water; a freezing apparatus having freezing elements; hydraulically operated means for moving said receptacle of water to dispose the water in said receptacle into and out of contact with said freezing elements of said apparatus; means for draining said receptacle of water and for supplying water to the receptacle, whereby the water in said receptacle is drained and replenished between each movement of said receptacle out of position in which the water is in contact with said freezing elements to a position in which said water is disposed in freezing contact with said freezing elements, whereby a fresh body of water is moved into contact with the freezing elements each cycle; an operating arm mounted on one end of a first pivot rod above said water receptacle and adapted to be pivoted by the edge of said receptacle when said receptacle is in its uppermost position; ratchet wheel means mounted adjacent said first pivot rod; ratchet arm means mounted on the other end of said first pivot rod and adapted to turn said ratchet wheel the distance of one tooth each time said receptacle pivots said operating arm; at least one cam pin means mounted on said ratchet wheel and rotatable therewith; cam arm means mounted on one end of a second pivot rod and operatively engageable with said cam pin at a preselected angular location of said ratchet wheel to pivot said second pivot rod; a lever arm mounted on the other end of said second pivot rod and adapted to be pivoted by said rod; a lifting rod depending from said lever arm and adapted to be raised by the pivoting of said lever arm; and a valve closure means mounted on the lower end of said lifting rod and adapted to be alternately lowered into and lifted from a position closing a drain hole in said receptacle.

11. In an ice making machine: a receptacle for water; a freezing apparatus having freezing elements; hydraulically operated means for moving said receptacle of water to dispose the water in said receptacle into and out of contact with said freezing elements of said apparatus; means for draining said receptacle of water and for supplying water to the receptacle; valve controlled means for supplying liquid to the hydraulically operated means, whereby the water in said receptacle is drained and replenished between each movement of said receptacle out of position in which the water is in contact with said freezing elements to a position in which said water is disposed in freezing contact with said freezing elements, whereby a fresh body of water is moved into contact with the freezing elements each cycle; an outer fixed drain pipe vertically mounted in a fixed position below said water receptacle; an inner drain pipe fixedly attached to the bottom of and leading downwardly from a drain hole in said receptacle, said inner drain pipe being slidably mounted inside said outer drain pipe; an operating arm mounted on one end of a first pivot rod above said receptacle and adapted to be pivoted by the edge of said receptacle when said receptacle is in its uppermost position; ratchet wheel means mounted adjacent said first pivot rod; ratchet arm means mounted on the other end of said first pivot rod and adapted to turn said ratchet wheel the distance of one tooth each time said receptacle pivots said operating arm; at least one cam pin means mounted on said ratchet wheel and rotatable therewith; cam arm means mounted on one end of a second pivot rod and operatively engageable with said cam pin at a preselected angular location of said ratchet wheel to pivot said second pivot rod; a lifting arm mounted on the other end of said second pivot rod and adapted to be pivoted by said rod; a lifting rod depnding from said lifting arm and adapted to be raised by the pivoting of said lifting arm, and a valve closure plug mounted on the lower end of said lifting rod and adapted to alternately fit into and be pulled from said drain hole in said receptacle to open and close said drain hole.

12. An ice-making apparatus of the refrigeration-harvest cycle type, comprising: refrigeration means including, a cooling coil adapted to form a plurality of unitary pieces of ice thereon when said coil is cold and is in contact with a body of water; container means for a body of water movable into and out of position wherein said water is in contact with said refrigeration cooling coil; motive means adapted to move said container means to move said body of water into and out of contact with said coil; means for draining and replenishing the body of water in said container means each time the container means is moved to a position in which the water is out of contact with said cooling coil; electrical switch means adapted to automatically stop said motive means when said body of water is in contact with said coil and to hold said body of water in this position; and temperature sensitive electrical control switch means adapted to maintain said refrigeration means in the refrigeration portion of the cycle and, in cooperation with said electrical switch means, maintain said motive means in operating condition, and, in the alternative, to maintain said refrigeration means in the harvest portion of said cycle.

13. Apparatus in accordance with claim 12, wherein the motive means is a mechanical system actuated by a hydraulic fluid.

14. Apparatus in accordance with claim 12, wherein the control switch means includes a temperature sensing element mounted adjacent the coil and spaced from the coil a distance sufficient to permit a predetermined thickness of ice to form between said coil and said sensing element.

15. Apparatus in accordance with claim 14, wherein the control switch means opens a valve which flows hot gas from the compressor of the refrigeration means through the cooling element to free the unitary pieces of ice from said cooling coil.

16. Apparatus in accordance with claim 15, wherein the hot gas is flowed through the cooling element in the same direction the flow of refrigerant during the refrigeration portion of the cycle.

17. Apparatus in accordance with claim 12, wherein the control switch means actuates a lowering system for lowering the container for the body of water.

18. Apparatus in accordance with claim 12, which additionally includes a thermostatic switch to turn the entire system off and on in response to the amount of ice in a storage bin connected with the apparatus.

19. Apparatus in accordance with claim 12, which additionally includes a drain system for periodically and at predetermined numbers of cycles draining said body of water from its container.

20. An ice making machine including: a refrigerating mechanism including a motor compressor unit, a condenser, a liquid receiver, and an evaporator cooling member; a plurality of depending cooling nipples mounted at spaced intervals along said evaporator member; water container means for holding a body of water; means for moving said water container into and out of position to dispose the water therein in heat exchanging relationship with the nipples; defrosting means for freeing ice formed on the nipples from the nipples while the water container is out of position in which the water is in heat exchanging relationship with the cooling nipples, means for draining and refilling said water container means with water while said water container means is out of position disposing the water therein in heat exchanging relationship with the nipples to provide a fresh body of water for each freezing operation; and means for gathering the ice removed from the nipples in a place of storage, and wherein said cooling member includes a horizontally disposed continuous tubular conductor member, and the depending cooling nipples comprise finger members having closed lower ends and upper ends in open communication with said tubular conductor; and baffle means is provided in each of said finger members extending from a point spaced above the closed lower end of said finger member to a point spaced below the upper portion of the horizontally disposed tubular conductor to provide an opening at each end of the baffle whereby refrigerant may pass from the conductor on one side of the baffle through the opening at the upper end of the baffle to the conductor on the opposite side of the baffle, and whereby a portion of said refrigerant is directed downwardly through the finger member and through the opening at the lower end of the baffle at the closed end of the finger from one side to the other side of the baffle and upwardly through the finger to the tubular conductor member.

21. In an ice making apparatus wherein a cooling member is contacted with water to form a plurality of bodies of ice on portions of said member, the improvement comprising: a horizontally disposed continuous tubular conductor member having a plurality of finger shaped elements depending from the bottom of said tubular conductor and in open communication with the interior of said tubular conductors; each of said elements having longitudinal baffle means extending transversely of said finger shaped elements and across a portion of the bore of said tubular member immediately above said element; each of said baffle means having its upper end spaced from said tubular member a distance sufficient to permit passage of refrigerant over the upper end of said baffle from the tubular member on one side of said baffle to the tubular member on the opposite side of said baffle without passing through said depending finger element and having its lower end spaced from the bottom of said finger element a slightly larger distance sufficient to permit the passage of refrigerant downwardly between one side wall of said finger element and one side of said baffle, between the bottom of said baffle and the other side of said element; a container for a body of water movable into and out of each exchanging relationship with the depending finger element of said conductor member for freezing water on said depending finger elements; and filler means mounted on said refrigerant conductor member and having apertures therein in which said depending fingers are disposed in spaced axial relationship with respect to said apertures in said filler member, said filler member fitting closely within the water container when said container is in said position disposing the water in contact with said depending fingers, whereby said filler member substantially fills the container and provides means for reducing the volume of water in said container member required to form bodies of ice on said finger members.

22. In an ice making machine: a freezing apparatus having a plurality of depending laterally spaced freezing elements; a receptacle for water having means providing a reduced volume of water exposed in said receptacle engageable with said depending freezing elements to form bodies of ice thereon; means for moving the receptacle of water with respect to said freezing elements to move the water in said receptacle into and out of contact with said freezing elements of said freezing apparatus; and sensing means spaced from one of said depending freezing elements engageable by the ice formed on said element and operable to actuate said means for moving said receptacle of water away from said freezing elements to move the water in said receptacle out of freezing contact with said freezing elements.

References Cited

UNITED STATES PATENTS

| | | | |
|---|---|---|---|
| 2,114,642 | 4/1938 | West | 62—73 |
| 2,585,240 | 2/1952 | Grow | 62—352 X |
| 2,737,786 | 3/1956 | Lindenberg | 62—349 |
| 2,949,019 | 8/1960 | Roberts | 62—348 X |
| 3,009,336 | 11/1961 | Bayston et al. | 62—347 X |
| 3,171,267 | 3/1965 | Mitchell | 62—352 |
| 3,228,202 | 1/1966 | Cornelius | 62—347 X |

ROBERT A. O'LEARY, *Primary Examiner.*

MEYER PERLIN, *Examiner.*

W. E. WAYNER, *Assistant Examiner.*